May 25, 1937. W. I. JONES 2,081,400
LAUNDRYPROOF SNAP FASTENER
Filed June 1, 1936
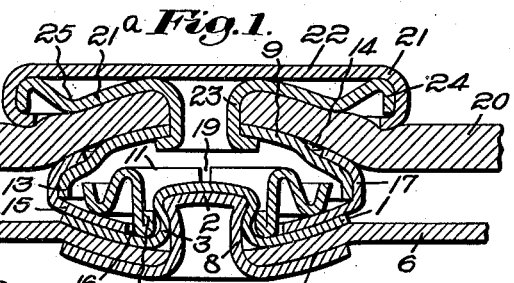
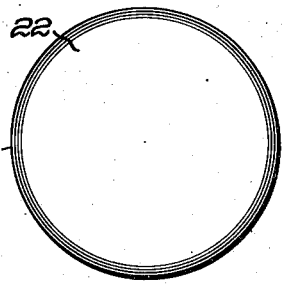
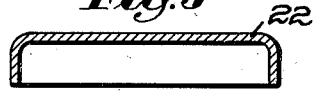
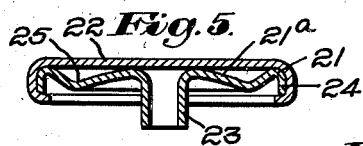
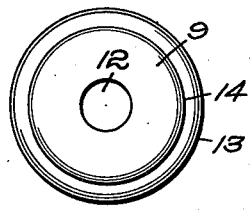
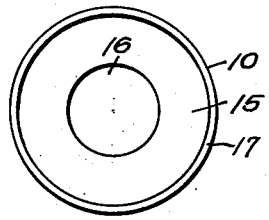
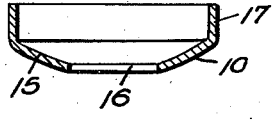
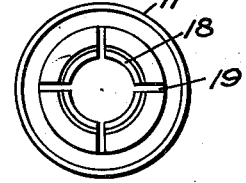
Inventor:
Walter I. Jones
by
Atty.

Patented May 25, 1937

2,081,400

UNITED STATES PATENT OFFICE 2,081,400

LAUNDRYPROOF SNAP FASTENER

Walter I. Jones, Arlington, Mass., assignor to United-Carr Fastener Corporation, Cambridge, Mass., a corporation of Massachusetts Application June 1, 1936, Serial No. 82,903

10 Claims. (Cl. 24—216)

My invention aims to provide improvements in snap fastener members of the stud and socket type for garments intended to be laundered.

An object of my invention is to provide snap fastener members of such strong, durable construction so as to permit them to be subjected to pressure without crushing of the socket when the carrying material to which they are attached is washed or ironed.

Another object of my invention is to construct the socket member and the rivet means for attaching a socket member to the carrying material in such a way that a relatively great bearing surface is presented by the parts for maintaining the socket device in secure attachment to the carrying material.

In the accompanying drawing, illustrating a preferred form of my invention:

Figure 1 is a vertical section through a complete snap fastener installation;

Fig. 2 is a top view of the cap means adapted to be fitted to my improved attaching rivet;

Fig. 3 is a vertical section of the part shown in Fig. 2;

Fig. 4 is a vertical section of my attaching rivet;

Fig. 5 is a vertical section of my attaching rivet with the cap assembled therewith;

Fig. 6 is a top plan view of the attaching part of my socket member;

Fig. 7 is a vertical section of the part shown in Fig. 6;

Fig. 8 is a bottom plan view of the casing part of my socket member;

Fig. 9 is a vertical section of the part shown in Fig. 8;

Fig. 10 is a plan view of the spring means of my socket member; and

Fig. 11 is a section of the part shown in Fig. 10.

Referring to Figure 1, I have shown a fastener installation including a stud unit having a stud member provided with a base 1 and a boss pressed from the base to provide a head 2 and a neck 3 for cooperation with a spring means 11 of the socket member. I also use an attaching rivet for securing the stud member to a garment 6. The attaching rivet has a base 7 disposed on the other side of the garment 6 from the base 1 of the stud member and a tubular projection 8 extending through the material 6 and into the hollow boss of the stud member where it is upset in the usual manner to clinch the material 6 between the bases 1 and 7 of the parts of the stud unit.

The socket member of my socket unit is preferably formed of three separate parts, most clearly shown in Figs. 6 through 11, including a cup-shaped attaching part 9, a cup-shaped front casing part 10 and a spring 11. The attaching part 9, as most clearly shown in Figs. 6 and 7, is in the form of a sheet metal cup-shaped part having an open end and an aperture 12 formed in the body of the part 9 substantially at the point at which the axial line of the part extends through the body portion thereof. A straight peripheral wall 13 substantially parallel with the axis of the part, is provided at the peripheral free edge of the part. A peripheral groove 14 is formed in the body of the part 9 between the aperture 12 and the peripheral wall 13 for a purpose which will be hereinafter more fully described.

The casing part 10, illustrated in Figs. 8 and 9, is in the form of a sheet metal cup-shaped part having a front wall 15 provided with a stud-receiving aperture 16. The front wall 15 is preferably of bow-shaped cross-section, as shown in Figs. 1 and 9, in order to give additional strength to the casing part. A crimping wall 17 is integral with the front wall 15. The spring 11, as illustrated in Figs. 10 and 11, is formed of sheet metal and is of tubular form having an inturned lip 18 surrounding a stud-receiving aperture and slits 19 providing the necessary resiliency in the part so that the lip 18 may engage the neck 3 of the stud member. The spring part 11 is adapted to be floatingly mounted within the socket member in a manner to be described.

As a means for attaching the socket member to a carrying material 20, I have provided an attaching rivet, as most clearly shown in Fig. 4, having a base 21 preferably of circular shape to fit within a circular cap 22 (Fig. 2), and a tubular eyelet 23 extending from substantially the center thereof. In order that the attaching rivets may pass down a guideway in a machine for assembly with the caps 22 in proper line and without overlapping one upon another, I have formed a flange 24 at the peripheral free edge of the base 21 substantially parallel with the axis of the eyelet 23. A peripheral groove 25 is preferably provided in the base 21 between the eyelet 23 and the flange 24 causing a portion 21a of the base 21 to slant downwardly away from the points of junction of the base with the eyelet 23. The base extends upwardly from the lowermost points of the portion 21a to meet the flange 24. As a result of the particular construction of the base 21 the portion 21a will be disposed in angular relation to the flat top surface of the cap 22 when the latter part is assembled with the attaching rivet (Fig. 5). Thus I have provided a thick edged attaching device which is relatively easy to feed in an automatic attaching machine and have provided a curved under surface which cooperates with the curved surface of the part 9 to grip the material 20 over a maximum area.

In assembling the parts of my socket member the spring part 11 is disposed within the attaching part 9 and the casing 10 is secured to the attaching part 9 by crimping the flange 16 over the walls 13 of the attaching part and the material of the body portion adjacent thereto. After the casing has been assembled with the attaching part, the free end of the flange 17 will lie within the peripheral groove 14 of the attaching part and the free end of the peripheral wall 13 of the attaching part will engage the front wall 15 of the casing substantially as shown in Fig. 1. In my preferred form, the spring 11 is of such size relative to the enclosure provided by the attaching part 9 and the casing 10 as to be capable of lateral movement or floating within the parts, but with the lip 17 in registry with the aperture 16 of the front wall 10 of the casing for receiving the head 2 of the stud member. As a result of the manner in which the bowed front face 15 of the casing part 10 is supported by the free ends of the peripheral wall 13 of the attaching part 9, an outer covering for the spring 11 is provided having a very rigid construction and ordinary crushing forces applied to the socket member in use will not injure the walls of the attaching part or the casing part so as to prevent proper expansion of the spring 11 when the stud is engaged with the socket. It will be noted that the spring has a rigid outer wall adjacent to the cooperating peripheral walls of the casing which also provides a protection for the spring and adds to the rigidity thereof.

In order to attach the socket member to the carrying material 20, the eyelet 23 is inserted through the material 20 and the aperture 12 of the attaching part and upset so as to engage the material of the attaching part surrounding the aperture 12 in a well known manner. After the socket member has been secured to the carrying material 20 by means of the attaching rivet, the material 20 is pressed between the socket member and the downwardly extending portion 21a of the base of the attaching rivet. Due to the fact that the free end of the flange 17 of the casing part lies within the groove 14 of the attaching part when in crimped engagement with the attaching part, a greater amount of material of the socket member bears upon the material 20 than would be the case if the groove 14 were to be omitted and the flange 17 crimped over a regularly curved outer surface of the body portion of the attaching part. As a result of my improved construction, the downwardly extending portion 21a of the base 21 of the attaching rivet cooperates with the outer surface of the socket member in a way to enable a relatively large portion of the socket unit to bear upon opposed sides of the covering material 20 thereby insuring permanent attachment of the socket device to the same.

Among the improvements presented by my laundryproof fastener over those heretofore known in the art are included first, the relatively strong construction of the fastener members which prevent crushing of the same when subjected to abnormal forces and secondly, the original construction of the parts of the socket unit enabling the carrying material to be gripped between broad opposed surfaces of the parts.

Although I have illustrated and described a preferred form of my invention, I do not wish to be limited thereby because the scope of my invention is best defined in the following claims.

I claim:

1. A socket member for a separable snap fastener including a cup-shaped attaching part having an open end, a casing having a front wall provided with a stud-receiving aperture, a spring contained within said casing and said attaching part, the peripheral free edges of said casing in clinched engagement with the outer surface of said attaching part, and the front wall of said casing being of bowed cross-section for cooperating with said attaching part to prevent crushing of said casing when subject to abnormal pressure.

2. A socket member for a separable snap fastener including a cup-shaped attaching part having an open end, a casing having a front wall provided with a stud-receiving aperture, a spring contained within said casing and said attaching part, said casing having peripheral free edges in clinched engagement with the outer surface of said attaching part, and said attaching part having a substantially straight peripheral wall substantially parallel with the axis of the socket and engaging the inner surface of the front wall of said casing whereby said front wall and said peripheral wall combine to prevent crushing of said casing.

3. A socket structure for a separable snap fastener including a cup-shaped attaching part having an open end, means to engage the attaching part to secure the socket member in working position, a casing having a front wall enclosing said open end and having an aperture to receive a cooperating stud, a spring shiftably mounted within said casing and said attaching part, said casing having peripheral free edges in clinched engagement with the outer surface of said attaching part, and the front wall of said casing being of bowed cross-section to cooperate with said attaching part to prevent crushing of said casing.

4. A socket structure for a snap fastener including a cup-shaped attaching part having an open end, means to engage the attaching part to secure the socket member in working position, a casing having a front wall provided with a stud-receiving aperture, a spring shiftably mounted within said casing and said attaching part, said casing having peripheral free edges in clinched engagement with the outer surface of said attaching part, said attaching part having a peripheral wall substantially parallel with the axis of the socket and engaging the inner surface of the front wall of said casing, and the front wall of said casing being of bowed cross-section to cooperate with said peripheral wall to prevent crushing of said casing.

5. A socket member for a separable snap fastener including a cup-shaped attaching part having an open end, said attaching part having a peripheral groove in the body thereof, a casing having a front wall provided with a stud-receiving aperture, a spring contained within said casing and said attaching part, the peripheral free edges of said casing in clinched engagement with the outer surface of said attaching part within said peripheral groove, and the front wall of said casing having a bowed cross-section to cooperate with said attaching part for preventing crushing of said casing when subject to abnormal pressure.

6. A socket member for a snap fastener including a cup-shaped attaching part having an open end and an aperture at substantially the point in the body of said part at which the axial line of said part extends through the same, said aperture adapted to receive a rivet means for securing said socket member to a support, said part having a substantially straight peripheral wall substantially parallel with the axis of the socket and a peripheral groove disposed in the body portion between said aperture and said wall, a casing having a front wall provided with a stud-receiving aperture, a spring shiftably mounted within said casing and said attaching part, said casing having peripheral free edges in clinched engagement with said attaching part within said peripheral groove, and the peripheral wall of said attaching part engaging the inner surface of the front wall of said casing whereby said front wall and said peripheral wall combine to prevent crushing of said casing.

7. A laundry-proof snap fastener socket formed entirely from sheet metal and comprising, in combination, three pieces constructed and arranged to provide a thin smooth socket for snap fastening engagement with a stud, two of said pieces being substantially cup-shaped and having peripheral walls arranged side by side one encircling the other, one of said walls having a portion clinched inwardly to secure the two parts together to form a casing, the third part comprising a spring of tubular form located within the casing and having a rigid outer wall adjacent to the walls of the other parts and having a laterally yieldable tubular stud-receiving portion, said casing having a stud-receiving aperture in alignment with the stud-receiving portion of said spring, and said walls cooperating to prevent crushing and jamming of said spring when said socket is subjected to pressure.

8. A laundry-proof snap fastener socket formed entirely from sheet metal and comprising, in combination, three pieces, two of said pieces being substantially cup-shaped and having peripheral walls arranged side by side one encircling the other, one of said walls having a portion clinched inwardly to secure the two parts together to form a casing, the third part comprising a spring of tubular form located within the casing and having a rigid outer wall adjacent to the walls of the other parts and having a yieldable tubular stud-receiving portion, said casing having a stud-receiving aperture in alignment with the stud-receiving portion of said spring, said walls cooperating to prevent crushing and jamming of said spring when said socket is subjected to pressure, and said spring being of such dimensions as to float within said casing.

9. An attaching rivet for securing a snap fastener member to a carrying medium including a base, said base having a flange at its peripheral free edge substantially parallel with the axis of said rivet, a tubular rivet means projecting from substantially the center of said base and adapted to extend through the carrying medium and be upset within the snap fastener member, and an annular groove in said base located between said rivet means and said flange whereby a portion of said base slants downwardly relative to the normal plane thereof for the purpose described.

10. An attaching rivet for securing a snap fastener member to a carrying medium including a base, said base having a flange at its peripheral free edge substantially parallel with the axis of said rivet, a tubular rivet means projecting from substantially the center of said base and adapted to extend through the carrying medium and be upset within the snap fastener member, a cap assembled with said base and having a top portion overlying said base and a portion of said base between said rivet means and said flange slanting downwardly relative to the normal plane of the top portion of said cap for the purpose described.

WALTER I. JONES.